July 21, 1959

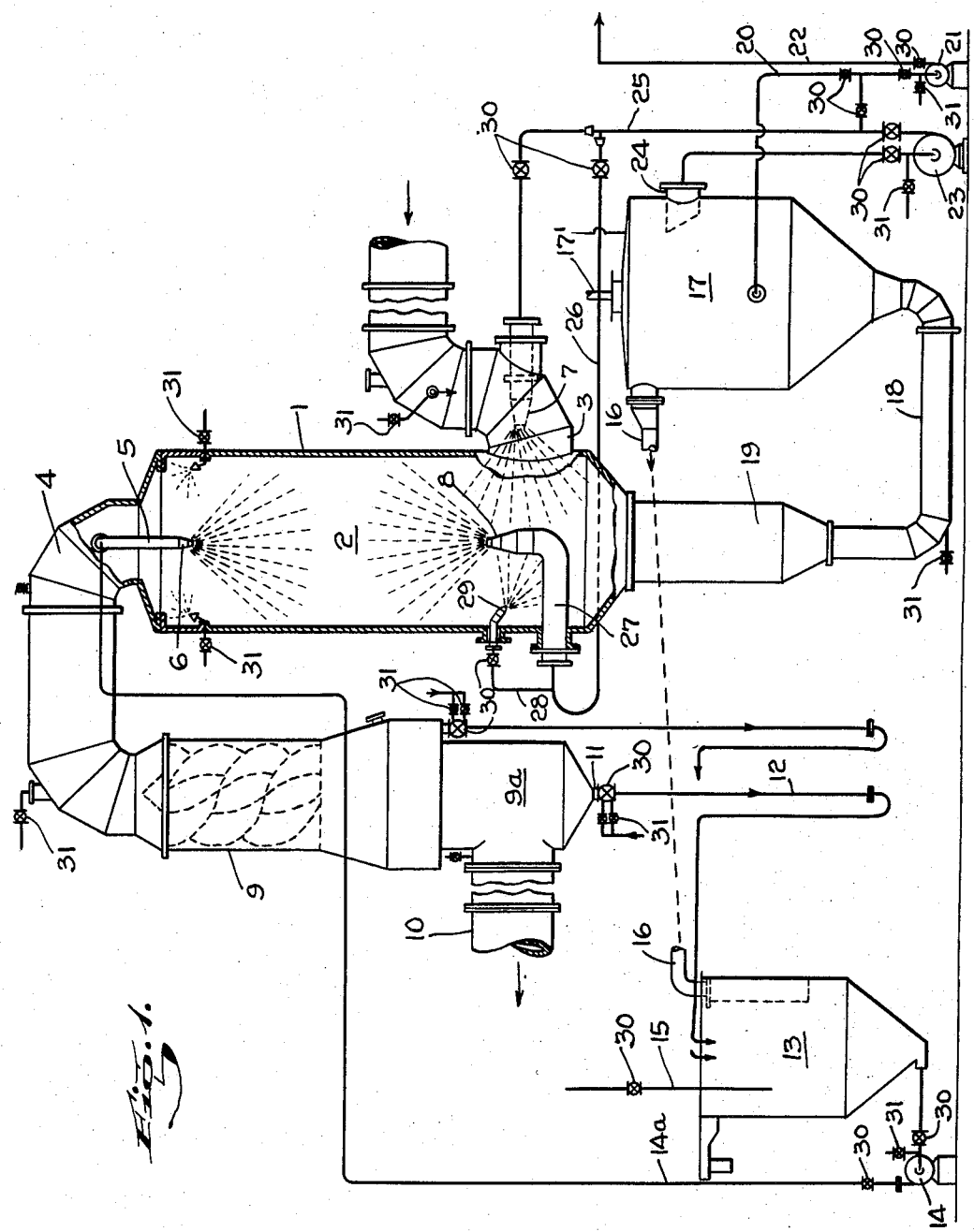

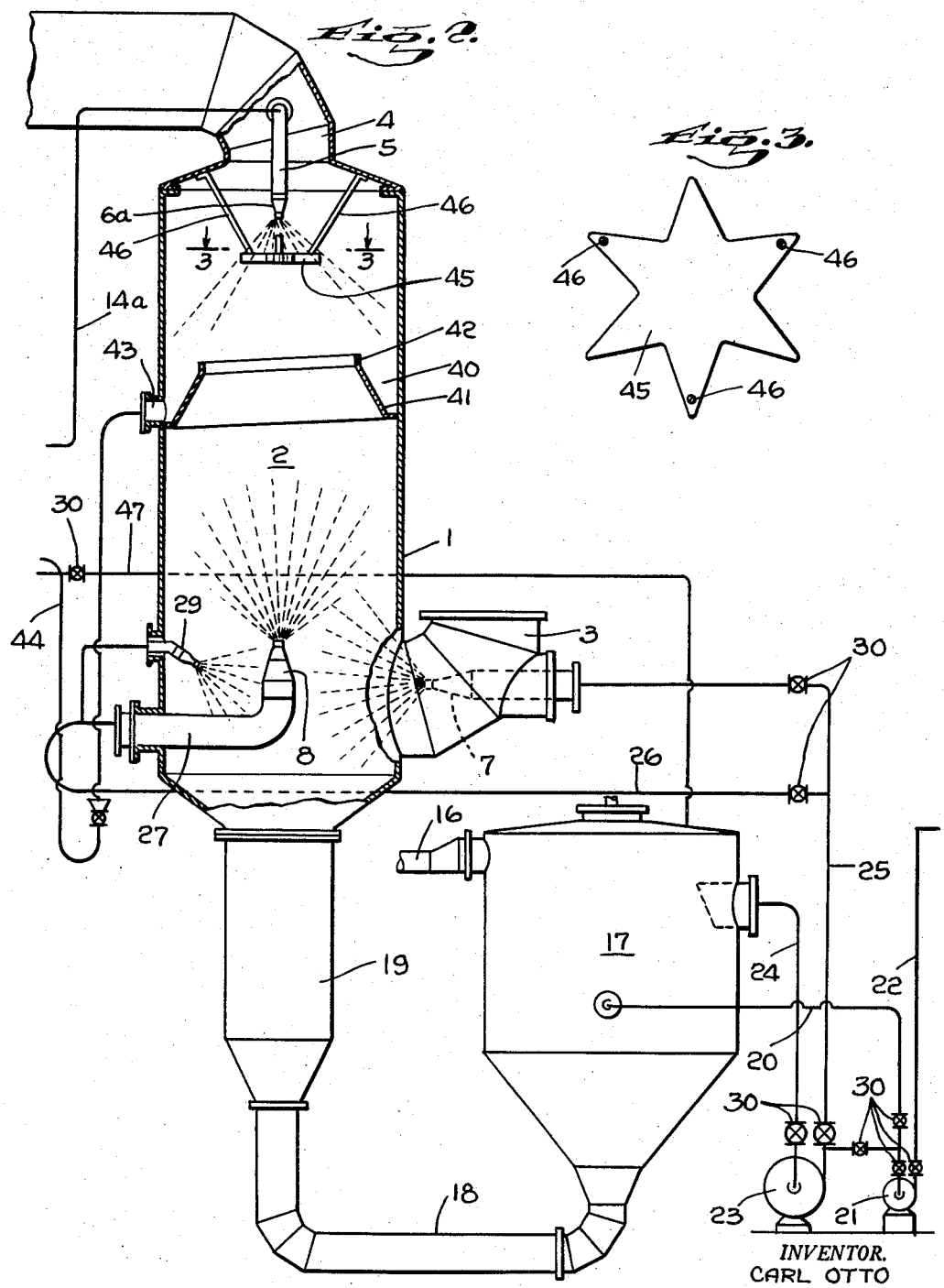

C. OTTO 2,895,800

METHOD OF AND APPARATUS FOR PRODUCING
AMMONIUM SULPHATE CRYSTALS

Filed Aug. 27, 1954

INVENTOR.
CARL OTTO

BY
John E. Hubbell
ATTORNEY

United States Patent Office 2,895,800
Patented July 21, 1959

2,895,800

METHOD OF AND APPARATUS FOR PRODUCING AMMONIUM SULPHATE CRYSTALS

Carl Otto, Manhasset, N.Y.

Application August 27, 1954, Serial No. 452,574

5 Claims. (Cl. 23—119)

The present invention relates to the method of and apparatus for producing ammonium sulphate crystals from coke oven gas or other gas having a small ammonia content, by the liquor and crystal dispersion method disclosed and claimed in my prior Patent 2,599,067, granted June 3, 1952, and now in extensive commercial use.

In the usual form of apparatus for use in the practice of the invention of said prior patent, the gas treated passes upwardly through a vertically elongated tank structure which surrounds a substantially unobstructed scrubbing space having a lower gas inlet and an upper gas outlet, and ammonium sulphate liquor and entrained crystals are continuously sprayed into the scrubbing space by spray nozzles located at different levels. Customarily, the tank structure also surrounds a liquor and crystal receiving bath space beneath the scrubbing space and into which liquor and crystals continuously drop down from the scrubbing space.

The supersaturated liquor and crystal mixture tends to quickly desupersaturate itself as a result of the deposit of ammonium sulphate in crystalline form on crystals in said mixture, with a resultant "growth" or increase in the size of the crystals. In some cases, and particularly when it is desired to produce relatively large crystals, liquor and crystals are passed from the lower end of the liquor bath space in the saturator tank into a crystallizer tank which may also serve as a classifier, and in which the desupersaturating action initiated in the lower portion of the saturator tank is completed. Such a classifier is provided with liquor and crystal discharge outlets at different levels.

The primary object of the present invention is to provide means for maintaining a substantially lower percentage of sulphuric acid in the lower portion of the scrubbing space than is maintained in the higher portion of said space. In my above mentioned patent and in the numerous liquor and crystal dispersion installations which have been constructed under my supervision, I have continuously recognized the desirability of having the acidity of the spray liquor higher in the upper portion than in the lower portion of the scrubbing space to thereby avoid the production of undesirably small ammonium sulphate crystals. The need for a relatively low ammonia content in the liquor in the lower portion of the scrubbing space is directly due to the avidity with which ammonia in the gas combines with sulphuric acid in the spray scrubbing liquor. That avidity depends on the ammonia content of the gas and on the percentage of sulphuric acid in the spray liquor. In practice, it is important to bring the gas into initial contact with spray liquor having an acid content substantially lower than the acid content in the spray liquor in the upper portion of the scrubbing space. In practice, also, the ammonium sulphate liquor passing into the scrubbing space must have a total sulphuric acid content which is sufficient in quantity, and is so brought into contact with the gas, that ordinarily more than 99% of the ammonia content of the gas will combine with sulphuric acid in the spray liquor within the scrubbing space.

In consequence, a primary object of the invention is to provide improved means for maintaining a relatively high acid content in the spray liquor passing downward through the upper portion of the scrubbing space and to maintain a relatively low acid content in the spray liquor moving through the lower portion of the scrubbing space in which the gas passes into contact with the spray liquor.

The present invention may take various forms but the different forms are alike in that each form includes means for spraying a relatively small portion of the total required amount of scrubbing liquor having a relatively high sulphuric acid content, into the upper portion of the scrubbing space, and simultaneously spraying upward in a lower portion of the scrubbing space a major portion of the required amount of spray liquor which has a relatively low acid content. Thus, for example, in one desirable form of the invention, hereinafter described in some detail, and operated to produce 40 tons of ammonium sulphate per day, scrubbing liquor having an acid content of 8 or 9% is sprayed downward into the upper portion of the scrubbing space at the rate of 70 gallons per minute, and scrubbing liquor having an acid content of 2% or 3% is sprayed upward into the lower portion of the scrubbing space at the rate of 2400 gallons per minute. If the amount of liquor sprayed upward into the lower portion of the scrubbing space were doubled without change in the rate of salt production, the acidity of the liquor spray upward should be reduced approximately to 1% or 1½%. Thus, when the amount of liquor sprayed into the scrubbing space is varied without changing the rate at which ammonium sulphate salt is produced, the amounts of acid sprayed into the respective upper and lower portions of the scrubbing space need not be varied.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a diagrammatic elevation of a scrubbing tank and desirable associated apparatus;

Fig. 2 is an elevation of a portion of the saturator structure shown in Fig. 1, including modified means for decreasing the number and increasing the size of the crystals formed in the initial contact of the gas with ammonium sulphate spray liquor;

Fig. 3 is a section on the line 3—3 of Fig. 2; and

Figure 4:
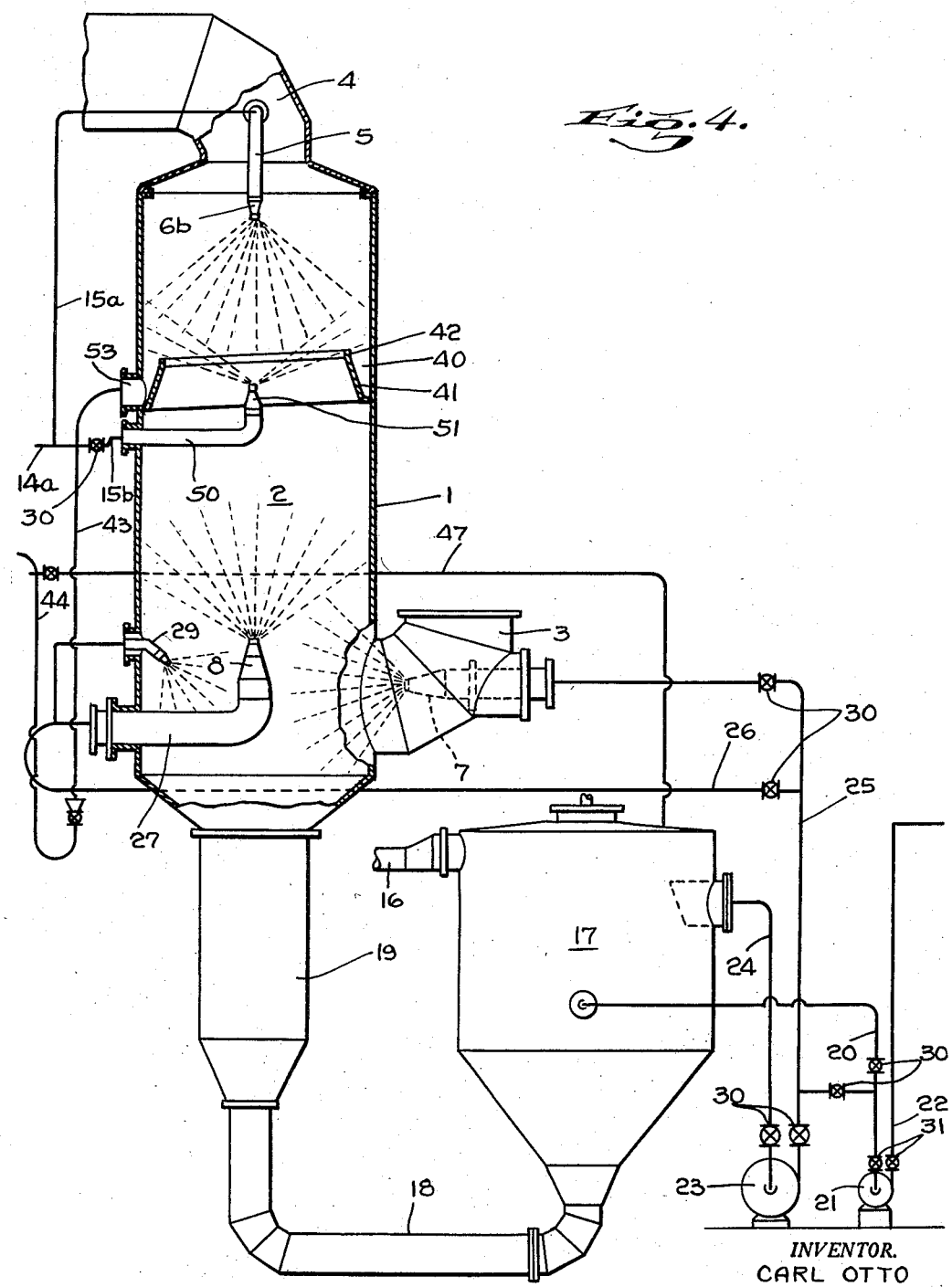
Fig. 4 is a sectional elevation illustrating a second modification of the saturator structure shown in Fig. 1.

The apparatus illustrated in Fig. 1 includes a tank structure 1 enclosing a vertically elongated scrubbing space 2 with a gas inlet pipe 3 opening horizontally into the lower portion of the space 2, and a gas outlet pipe 4 leading away from the upper end of the structure 1. Acidulated ammonium sulphate liquor and any entrained crystals are sprayed downwardly into the upper end of the scrubbing space through a depending pipe 5 having a spray nozzle 6 at its lower end. Acidulated ammonium sulphate liquor and entrained crystals are sprayed into the lower portion of the space 2 through a horizontal nozzle 7 and through a vertical nozzle 8. The nozzle 7 is horizontally disposed in the discharge end of the gas supply pipe 3, while the nozzle 8 is shown as having its discharge end centrally disposed and discharging upwardly in the space 2.

The outlet pipe 4 includes a depending vertical portion acting as an acid catcher 9 to recover entrained liquor particles and any sulphate particles passing away from the upper end of the space 2 through the outlet conduit 4. Most of the acid separated from the gas passing through the acid catcher 9 is collected in a chamber 9a beneath the acid catcher 9. The gas entering the chamber 9a passes from the chamber into an adjacent horizontal gas pipe or main 10. The acid collected in the lower portion of the chamber 9 passes by gravitational action through an outlet 11 into a pipe 12 which discharges in a liquid receiving tank 13 closed at its lower end. Liquor and entrained crystals are withdrawn from the lower end of the tank 13 by a pump 14 which discharges liquor under pressure through a pipe line 14a into the upper end of the spray pipe 5. The desired acidity of the liquor withdrawn through the pipe 14a is maintained by passing sulphuric acid into the tank 13 through an adjustable supply pipe 15. Acidified liquor and entrained crystals overflow into the tank 13 from a crystallizing tank 17 through a conduit 16.

Ammonium sulphate liquor and crystals pass downward away from the scrubbing space 2 through a vertical pipe 19 which serves as a bath space receiving liquor and crystals from the scrubbing space 2. The liquor and crystals pass downward through the pipe 19 and thence through a pipe 18 into the lower end of the tank 17. Normally the liquor passing from the scrubbing space 2 into the bath space 19 is supersaturated but is desupersaturated in the pipes 19 and 18 and crystallizing tank 17. As shown, the tank 17 has a vent pipe 17' extending upward away from the tank 17.

Liquor passing into the crystallizer and classifier tank 17 through the conduit 18 and through the overflow pipe 16, is normaly withdrawn from the tank at different levels. As shown, liquor and relatively large crystals are withdrawn from the tank 17 at a relatively low level by the inlet pipe 20 of a pump 21 which passes liquor and the relatively large crystals withdrawn from the tank 17 through a pipe 22 to a slurry tank or analogous apparatus, not shown. A pump 23 withdraws liquor and entrained crystals from the tank 17 through an outlet 24 at a level appreciably above the outlet 20. The pump 23 passes liquor and entrained crystals into the saturator space 2 through a discharge pipe 25 and spray nozzle 7. The pump 23 also passes liquor and entrained crystals through the pipe 25 and a branch pipe 26 to a pipe 27. The pipes 25 and 26 are shown as substantially larger in diameter than the pipe 5.

As shown, the pipe 27 extends horizontaly into the lower end of the chamber 2 and has an uprising end portion terminating in a discharge nozzle 8. The latter is axially disposed in the space 2, and has its upper discharge end at about the level of the upper side of the discharge end of the gas inlet pipe 3. The nozzle 8 is arranged to discharge a conical jet which extends across the lower portion of the space 2 at a level substantially below the lower end of the nozzle 6. A portion of the liquor passing through the branch pipe 26 may be passed into the space 2 through a branch pipe 28 which terminates in a nozzle 29 discharging into the lower end portion of the space 2. The nozzle 29 is located at the opposite side of the chamber 2 from the gas inlet pipe 3 and the horizontal nozzle 7 and serves to eliminate or minimize the accumulation of ammonium sulphate crusts on the portion of the tank wall facing the inlet 3. Advantageously and as shown, the nozzle 29 is inclined downwardly from the horizontal and is arranged to discharge a conical jet.

The dimensions and operating characteristics of apparatus of the character shown in Fig. 1, may be varied widely as conditions make desirable. However, it is noted by way of illustration and example, that the body portion of the saturator 1 shown in Fig. 1 may have a diameter of 6' 6", and a length between the pipe 19 and the gas outlet pipe 4 which is slightly greater than 18 feet. With such proportions and a normal rate of operation, the apparatus shown in Fig. 1 will produce 40 net tons of ammonium sulphate salt per 24 hour day. In such operation, ammonium sulphate liquor having a relatively minute quantity of entrained crystals may be passed through the pipe 5 and then sprayed downward into the upper portion of the nozzle 2 through the nozzle 6 at the rate of 70 gallons per minute. The liquor passed through the spray pipe 5 and nozzle 6 from the tank 13, advantageously has the relatively high acid content of 8-9%. Each of the nozzles 7, 8 and 29 sprays liquor and entrained crystals withdrawn from the tank 17 by a pump 23, into the lower portion of the scrubbing space 2. In the normal operation contemplated, liquor is discharged into the space 2 through each of the nozzles 7 and 8 at the rate of 1200 gallons per minute, and through the nozzle 29 at the rate of 60 gallons per minute. With the operating conditions described, the acidity of the liquor sprayed into the lower portion of the chamber 2 may well be of the order of 2 or 3.%

For the attainment of optimum results in the practice of the present invention, it is essential that the volume of the spray liquor with which the gas entering the space 2 through the pipe 3 first comes into contact, should be relatively large in volume and have a relatively low sulphuric acid content. The large volume of spray liquor having a small acid content with which the entering gas first comes into contact, slows down the reaction between the ammonia in the gas and the acid in the contacting liquor, and thereby reduces the number and increases the average size of the ammonium sulphate crystals or nuclei produced. In consequence, the relative amount of acid with which those crystals come into retarded contact, is increased with a resultant increase in size of the initial crystals or nuclei formed. The relatively large volume of liquor which the nozzle 8 sprays upwardly into the lower portion of the chamber 2, diminishes the speed of down movement of the relatively small amount of liquor having a relatively high acid content which is sprayed into the upper portion of the space 2 through the nozzle 6, and thus minimizes the small amount of ammonia which might otherwise pass into the gas outlet pipe 4.

As will be recognized by those skilled in the art, the amount of sulphuric acid combining with the ammonia in the gas supplied to the pipe 3, depends on the rate at which ammonium sulphate is formed. With the relatively large amount of liquor sprayed into the space 2 through the nozzles 7 and 8, the effect of an increase in the volume of the liquor sprayed through the nozzles 7 and 8, is to reduce the percentage of acid in the liquor without significantly varying the quantity of the acid utilized. In practice, however, the extent to which the liquor discharged by the nozzles 7 and 8 can be increased, is limited by the fact that the spray liquor discharged by the nozzles 7 and 8 should have an acidity of at least 2 or 3%. In some cases, the acidity of the liquor passing to the nozzles 7 and 8 may advantageously be increased by passing acid into the tank 17, or into the piping through which liquor passes from the tank 17 to the nozzles 7 and 8.

When liquor having a relatively low acidity is sprayed into the lower portion of the space 2 by the nozzles 7, 8 and 29, and with a relatively large portion of the liquor sprayed upwardly by the nozzle 8, no portion of the gas moving through the lower portion of the space 2 will come into contact with liquor having its acidity significantly effected by the high acidity of the liquor discharged through the nozzle 6. Eventually, of course, all of the liquor sprayed into the chamber 2 will pass into the bath space 19, except the relatively minute quantity entrained in the gas passing through the outlet 4. However, the relatively large amount of liquor sprayed upwardly through the nozzle 8 passes into admixture with the small volume of liquor discharged through the nozzle 6 at a level appreciably above that at which most of the ammonia in the gas supplied to the pipe 3 comes into contact with liquor having an acidity appreciably higher than that of the liquor discharged by the nozzles 7, 8 and 29. In consequence, the apparatus shown in Fig. 1 is well adapted to serve its intended purpose of combining most of the ammonia in the gas with liquor having an acidity much below that of the liquor discharged through the nozzle 6 and the high acidity of the last mentioned liquor does not extend downward into the portion of the space 2 in which the acidity of the liquor is significantly dependent on the acidity of the gas discharged by the nozzle 6. In accordance with the usual practice of the art, and as is indicated in the drawings, the liquor distributing pipes are provided with regulating and cut-off valves 30, and with hot water cleaning provisions 31.

The apparatus shown in Figs. 2 and 4 differs from the apparatus shown in Fig. 1, essentially only in the provisions in Figs. 2 and 4 for increasing the volume of high acidity liquor sprayed into the upper portion of the scrubbing space 2 and the withdrawal from said upper space portion of a substantial portion of the liquor sprayed into that space portion. The apparatus shown in Fig. 2 includes provisions for increasing the volume of liquor having a relatively high acidity sprayed into the upper portion of the space 2 without correspondingly increasing the acidity of the liquor sprayed into the upper portion of the space 2 and passing downward into the lower portion of said space. Thus, the dimensions of the tank 1 of Fig. 2 may be the same as those of the tank 1 of Fig. 1, and the ammonium sulphate output per day may be 40 tons, as in Fig. 1, and the acidity of the liquor respectively discharged by the nozzles 6a, 7, 8 and 29 of Fig. 2 may be substantially the same as the acidity of the liquor respectively discharged by the corresponding nozzles 7, 8, 29 and 6 of Fig. 1. However, the amount of liquor discharged by the pipe 6a is 200 gallons per minute instead of the 70 gallons per minute discharged through the nozzle 6.

As shown in Fig. 2, the major portion of the liquor discharged by the nozzle 6a is collected in an annular trough 40 surrounded by the cylindrical wall of the tank 1. The inner wall 41 of the trough 40 is in the form of a section of a hollow cone with a short vertical extension 42 at its upper end. The trough 40 has a lateral outlet 43 connected to a loop pipe 44. The latter is adapted to discharge liquor at the rate of 150 gallons per minute into a tank like the tank 13 of Fig. 1. As shown, the top and bottom portions of the trough 40 are inclined slightly to the horizontal to facilitate the passage of liquor entering the trough through the outlet 43 and pipe 44. Advantageously and as is indicated, the conical angle of the jet discharged by the nozzle 6a is wider than the discharge angle of the jet discharged by the nozzle 6 of Fig. 1. To further increase the amount of liquor discharged by the nozzle 6a which collects in the trough 40, I make use of an obstructor 45 between the nozzle 6a and the trough 40 in position to deflect the central portion of the jet discharged by the nozzle 6a away from the axis of that nozzle. As shown in Figs. 2 and 3, the obstructor 45 is in the form of a star, and is supported from the structure 1 by rods 46. As shown, some of the liquor having a relatively high acid content passing away from the trough 40 of Fig. 2 through the pipes 43 and 44, may be passed through a valved pipe branch 47 into the tank 17 to thereby increase the acid content of the liquor passed through the pipes 25 and 26 to the nozzles 7 and 8 of Fig. 2.

The form of the invention shown in Fig. 4 includes the trough 40 but omits the obstructor 45 of Fig. 2. In Fig. 4, however, liquor is sprayed upwardly and outwardly by a nozzle 51 through the space surrounded by the trough 40 and into the space above that trough. The nozzle 51 is formed by the upturned end of a horizontal pipe 50 extending through the cylindrical wall of the tank 1. In Fig. 4, the pipe 14a is provided with two branches 15a and 15b. Branch 15a passes liquor drawn from the tank 13 to the pipe 5 and the nozzle 6b. Branch pipe 15b passes liquor to the nozzle 51. With the tank 1 of Fig. 4 similar in dimensions and operation to the tank 1 of Fig. 1 and operative to produce 40 tons of ammonium sulphate per 24 hour day, the only remaining difference between the structures shown in Figs. 2 and 4 is the arrangement of the pipe 14a in the construction shown in Fig. 4, which supplies liquor at the rate of about 200 gallons per minute, 100 gallons per minute being passed to the pipe 5 and nozzle 6b by branch 15a, and 100 gallons per minute being passed to the pipe 50 and the nozzle 51 through branch pipe 15b.

The nozzle 51 may well be of the known type disclosed in the Preble Patent 1,705,679 of March 19, 1929, and adapted to produce a hollow conical jet. That jet deflects the outer portion of the conical liquid jet discharged by the nozzle 6b into the annular space above the trough 40 and thus reduces the amount of liquor which would otherwise pass down through the space surrounded by the trough 40. In Fig. 4, a valved connection 47 is adapted to pass liquor withdrawn from the trough 40 to the tank 17, as in Fig. 2. The various nozzles 6, 7, 8, etc., described as producing conical jets, may well be of the known type disclosed in the Eneas Patent 1,101,264 of June 23, 1914. The volume and form of the liquor jet discharged by each of the spray nozzles 6, 7, 8, 29, 6a, 6b and 51 may be varied by the replacement, or the adjustment in a known manner of one or more of said nozzles. In addition to the advantages already previously mentioned, it is to be noted that the maintenance of the relatively high acidity of the liquor sprayed into the upper portion of the scrubbing space is advantageous when pyridine is recovered from gas which has passed through the scrubbing space.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In producing ammonium sulfate by the liquor and crystal dispersion method in which gas having a small ammonia content is passed through a scrubbing space from a lower gas inlet to an upper gas outlet, the improvement which comprises the steps of spraying a relatively small portion of acidulated ammonium sulfate liquor having a relatively high sulfuric acid content into the upper portion of said space, spraying a relatively large portion of acidulated ammonium sulfate liquor having a relatively low sulfuric acid content upward into the lower portion of said space, and collecting liquor sprayed into said upper portion of said scrubbing space in an annular space adjacent the lower end of said upper portion, and withdrawing said collected liquor from said annular space.

2. In producing ammonium sulfate by the liquor and crystal dispersion method in which gas having a small ammonia content is passed through a scrubbing space from a lower gas inlet to an upper gas outlet, the improvement which comprises the steps of spraying a relatively small portion of acidulated ammonium sulfate liquor having a relatively high sulfuric acid content into the upper portion of said scrubbing space in the form of a hollow conical jet, spraying a relatively large portion of acidulated ammonium sulfate liquor having a relatively low sulfuric acid content upward into the lower portion of said scrubbing space, collecting said liquor having a relatively high sulfuric content at the boundary zone between said upper and lower scrubbing space portions, and withdrawing said collected liquor from said scrubbing space.

3. A spray saturator for the production of ammonium sulfate by the liquor and crystal spray dispersion method from gas having a small ammonia content, comprising a tank enclosing a scrubbing space having an upper and lower portion, said scrubbing space having a gas inlet adjacent the bottom of said lower portion and a gas outlet adjacent the top of said upper portion, a liquor outlet adjacent the bottom of said lower portion, means for spraying a mixture of acidified ammonium sulfate liquor and crystals having a relatively high acid content into the upper portion of said scrubbing space, means for collecting said last mentioned liquor adjacent the lower end of said upper portion of said scrubbing space, means for removing said collected liquor from said tank, and means for spraying a mixture of acidified ammonium sulfate liquor and ammonium sulfate crystals having a relatively low acid content upward into the lower portion of said scrubbing space at a volumetric rate substantially greater than the rate at which the first mentioned mixture is sprayed into said upper portion, whereby the acid content of the gas passing into the scrubbing space to said lower gas inlet is brought into initial contact with liquor having a relatively low acid content.

4. A spray saturator for the production of ammonium sulfate by the liquor and crystal spray dispersion method from gas having a small ammonia content, comprising a tank enclosing a scrubbing space having an upper and lower portion, said scrubbing space having a gas inlet adjacent the bottom of said lower portion and a gas outlet adjacent the top of said upper portion, a liquor outlet adjacent the bottom of said lower portion, a nozzle adapted to spray in the form of a conical jet a mixture of acidified ammonium sulfate liquor and crystals having a relatively high acid content into the upper portion of said scrubbing space, an annular trough adjacent the lower end of said upper portion for collecting said last mentioned liquor adjacent the lower end of said upper portion of said scrubbing space, means for removing said collected liquor from said tank, and means for spraying a mixture of acidified ammonium sulfate liquor and ammonium sulfate crystals having a relatively low acid content upward into the lower portion of said scrubbing space at a volumetric rate substantially greater than the rate at which the first mentioned mixture is sprayed into said upper portion, whereby the acid content of the gas passing into the scrubbing space to said lower gas inlet is brought into initial contact with liquor having a relatively low acid content.

5. In producing ammoinum sulfate by the liquor and crystal dispersion method in which gas having a small ammonia content is passed through a scrubbing space from a lower gas inlet to an upper gas outlet, the improvement which comprises the steps of spraying a relatively small portion of acidulated ammonium sulfate liquor having a relatively high sulfuric acid content into the upper portion of said space, spraying a relatively large portion of acidulated ammonium sulfate liquor having a relatively low sulfuric acid content upward into the lower portion of said space, and collecting liquor sprayed into said upper portion of said scrubbing space in a zone adjacent the lower end of said upper portion, and withdrawing said collected liquor from said zone.

References Cited in the file of this patent

UNITED STATES PATENTS

| | | |
|---|---|---|
| 2,375,922 | Jeremiassen | May 15, 1945 |
| 2,524,341 | Chapman et al. | Oct. 3, 1950 |
| 2,599,067 | Otto | June 3, 1952 |
| 2,645,560 | Otto | July 14, 1953 |
| 2,646,345 | Otto | July 21, 1953 |